(12) United States Patent
Ichikawa

(10) Patent No.: US 7,743,744 B2
(45) Date of Patent: Jun. 29, 2010

(54) AIR INTAKE DEVICE FOR VEHICLE INTERNAL COMBUSTION ENGINE

(75) Inventor: Hiroyuki Ichikawa, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/212,225

(22) Filed: Sep. 17, 2008

(65) Prior Publication Data

US 2009/0101100 A1    Apr. 23, 2009

(30) Foreign Application Priority Data

Oct. 18, 2007    (JP)    ............... 2007-270901

(51) Int. Cl.
F02M 35/10    (2006.01)
(52) U.S. Cl. .................. 123/184.21; 123/184.36; 123/184.49; 123/184.59
(58) Field of Classification Search ............ 123/184.21, 123/184.34, 184.42, 184.47, 184.26, 184.36, 123/184.44, 184.49, 184.59, 184.53
See application file for complete search history.

(56) References Cited

U.S. PATENT DOCUMENTS

| | | | |
|---|---|---|---|
| 1,735,630 A | 11/1929 | Bragg et al. | |
| 2,636,486 A * | 4/1953 | Taylor | 123/184.59 |
| 4,766,853 A * | 8/1988 | Iwanami | 123/184.49 |
| 4,898,144 A | 2/1990 | Kobayashi et al. | |
| 4,957,071 A | 9/1990 | Matsuo et al. | |
| 6,857,415 B2 | 2/2005 | Kayama et al. | |
| 2003/0226543 A1 | 12/2003 | Glugla et al. | |
| 2008/0103667 A1 | 5/2008 | Suzuki et al. | |

FOREIGN PATENT DOCUMENTS

| | | |
|---|---|---|
| DE | 4202393 A1 | 8/1993 |
| EP | 1103700 A2 | 5/2001 |
| JP | 2004-346830 A | 12/2004 |

\* cited by examiner

*Primary Examiner*—Noah Kamen
(74) *Attorney, Agent, or Firm*—Foley & Lardner LLP

(57) ABSTRACT

An internal combustion engine for a vehicle comprises a pair of intake collectors (3A, 3B) and a communicating pipe (13) connecting the pair of intake collectors (3A, 3B). A negative pressure supply port (15) supplying intake negative pressure of the internal combustion engine to a brake booster is provided at an end of the communicating pipe (13). By providing an air amount deviation compensating arrangement which compensates for a deviation in the amounts of air flowing into the pair of intake collectors (3A, 3B) from the brake booster when braking of the vehicle is released, the amounts of air supplied to the internal combustion engine from the pair of the intake collectors (3A, 3B) are equalized.

6 Claims, 5 Drawing Sheets

AIR INTAKE DEVICE FOR VEHICLE INTERNAL COMBUSTION ENGINE

FIELD OF THE INVENTION

This invention relates to a negative pressure supply from an internal combustion engine for a vehicle having two intake passages to a brake booster.

BACKGROUND OF THE INVENTION

JP2004-346830A, published by the Japan Patent Office in 2004, discloses air-fuel ratio control of an internal combustion engine for a vehicle in relation to an operation of a brake booster. The brake booster is connected to an intake passage downstream of a throttle of the internal combustion engine. The brake booster assists a braking pressure supplied from a master cylinder to brake cylinders by utilizing a difference between an intake negative pressure in the intake passage and atmospheric pressure in response to depression of a brake pedal of the vehicle.

When the brake pedal is released from depression, air in the brake booster is recirculated into the intake passage. The prior art device regulates the air pressure in the brake booster when the engine is started to be equal to the atmospheric pressure, thereby regulating the amount of air recirculated from the brake booster to the internal combustion engine to a constant level. By thus regulating the amount of air recirculated from the brake booster to the internal combustion engine to a constant level, the air-fuel ratio of an air-fuel mixture supplied to the internal combustion engine can be controlled to a constant ratio.

SUMMARY OF THE INVENTION

A V-shaped engine or a horizontally-opposed engine is generally equipped with a plurality of cylinder banks and intake passages for the respective cylinder banks. In an internal combustion engine of this kind, if a negative pressure supply port for the brake booster is formed in one of the intake passages, the following problem may arise.

The air recirculated into the intake passage from the brake booster makes the air-fuel ratio of the fuel mixture in one of the cylinder banks lean. If the fuel supply amount to this cylinder bank is increased to maintain the air-fuel ratio of the fuel mixture in this cylinder bank at a constant ratio, the output torque of this cylinder bank increases, generating a gap between the output torques of the two cylinder banks.

It is therefore an object of this invention to prevent a gap from occurring, when a brake pedal is released, in the output torques of the two cylinder banks of an internal combustion engine which supplies intake negative pressure to a brake booster.

To achieve the above object, this invention provides an air intake device for an internal combustion engine for a vehicle, comprising a pair of intake passages, a communicating pipe connecting the pair of intake passages, and a negative pressure supply port provided on the communicating pipe for supplying negative pressure to a brake booster which assists braking of the vehicle depending on the negative pressure.

The details as well as other features and advantages of this invention are set forth in the remainder of the specification and are shown in the accompanying drawings.

DESCRIPTION OF THE PREFERRED EMBODIMENTS

Figure 1:
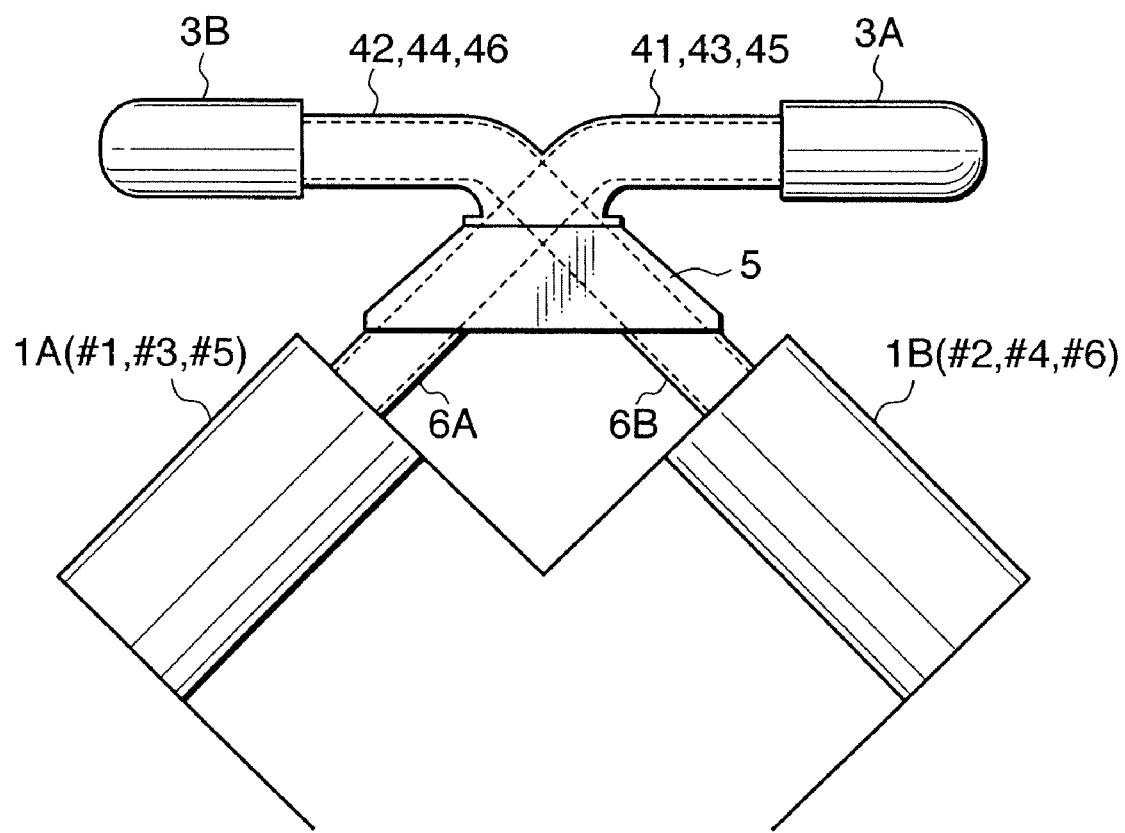
FIG. 1 is a schematic front view of essential parts of a V-shaped internal combustion engine to which this invention is applied.

Referring to FIG. 1 of the drawings, a V-shaped six-cylinder internal combustion engine for a vehicle to which this invention is applied comprises a pair of cylinder banks 1A and 1B. The cylinder banks 1A and 1B are internally provided with three cylinders, respectively. Specifically, the left cylinder bank 1A in the figure is provided with cylinders #1, #3, #5 and the right cylinder bank 1B in the figure is provided with cylinders #2, #4, #6. FIG. 1 shows the internal combustion engine viewed from a front side thereof.

The internal combustion engine comprises a right intake collector 3A which is disposed above the right cylinder bank 1B and a left intake collector 3B which is disposed above the left cylinder bank 1A. Branch pipes 41, 43, 45 are connected to the right intake collector 3A and branch pipes 42, 44, 46 are connected to the left intake collector 3B.

Three intake port extensions 6A project obliquely upward from the cylinders #1, #3, #5 of the left cylinder bank 1A and three intake port extensions 6B project obliquely upward from the cylinders #2, #4, #6 of the right cylinder bank 1B. The branch pipes 41, 43, 45 are connected to the three intake port extensions 6A via a lower block 5 and the branch pipes 42, 44, 46 are connected to the three intake port extensions 6B via the lower block 5.

Figure 2:
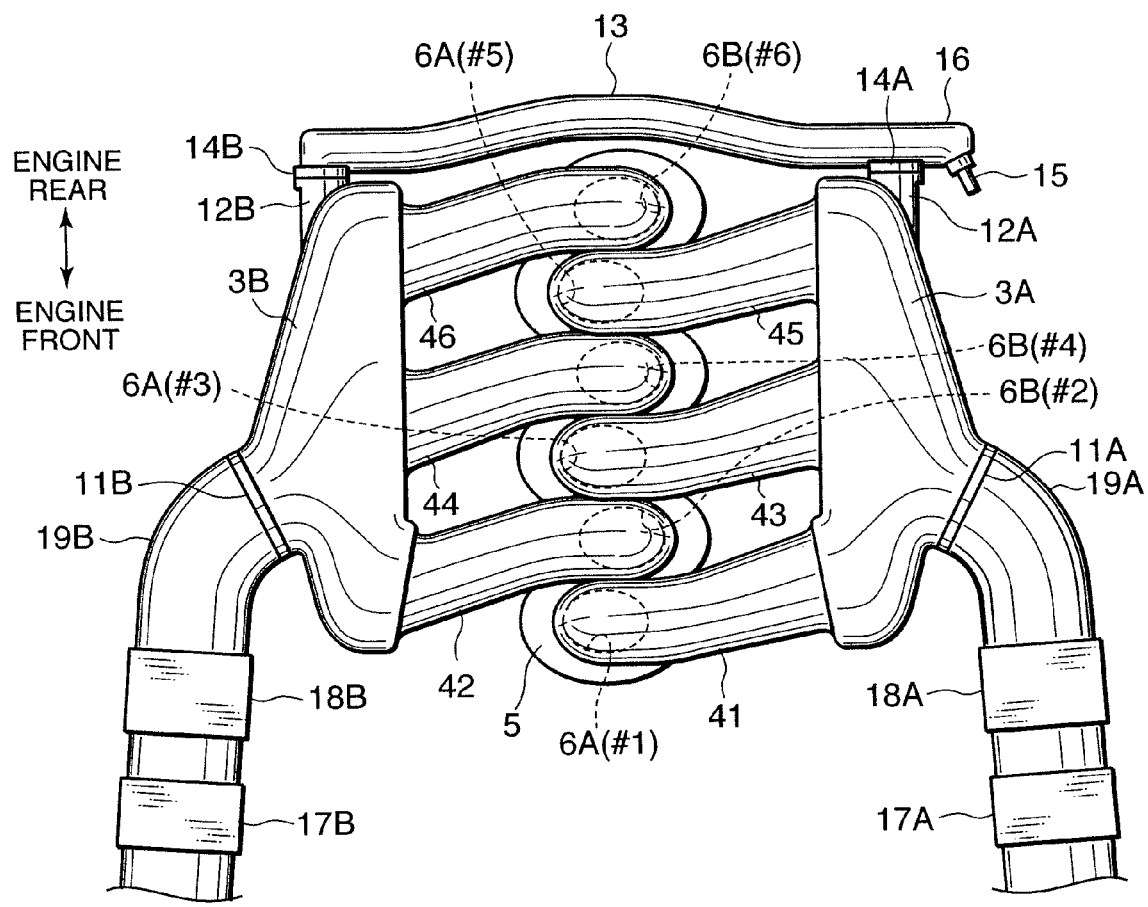
FIG. 2 is a plan view of essential parts of the internal combustion engine.

Referring to FIG. 2, the branch pipes 41, 43, 45 project leftward from the right intake collector 3A in the figure and are connected to the three intake port extensions 6A, which project into the lower block 5 from the left cylinder bank 1A. Similarly, the branch pipes 42, 44, 46 project rightward from the left intake collector 3B in the figure and are connected to the three intake port extensions 6B which project into the lower block 5 from the right cylinder bank 1B. As can be seen in the figure, the branch pipes 41, 43, 45 and the branch pipes 42, 44, 46 are disposed alternately in order of their reference numbers from the engine front towards the engine rear.

The intake collector 3A comprises an intake air inlet 11A. The intake collector 3B comprises an intake air inlet 11B. An intake pipe 19A provided with an air cleaner 17A and a throttle chamber 18A is connected to the intake air inlet 11A. An electronic throttle that regulates an intake air flow rate of the intake pipe 19A and an airflow meter that detects the intake air flow rate of the intake pipe 19A are provided in the throttle chamber 18A.

An intake pipe 19B provided with an air cleaner 17B and a throttle chamber 18B is connected to the intake air inlet 11B. An electronic throttle that regulates an intake air flow rate of the intake pipe 19B and an airflow meter that detects the intake air flow rate of the intake pipe 19B are provided in the throttle chamber 18B.

According to this embodiment, the intake collector 3A and the intake pipe 19A form an intake passage for the cylinders #1, #3, #5, while the intake collector 3B and the intake pipe 19B form an intake passage for the cylinders #2, #4, #6.

The intake collector 3A is provided with a communication port 12A facing the engine rear. The intake collector 3B is provided with a communication port 12B facing the engine rear. A communicating pipe 13 is provided on the rear side of the internal combustion engine to connect the communication ports 12A and 12B.

Figure 3:
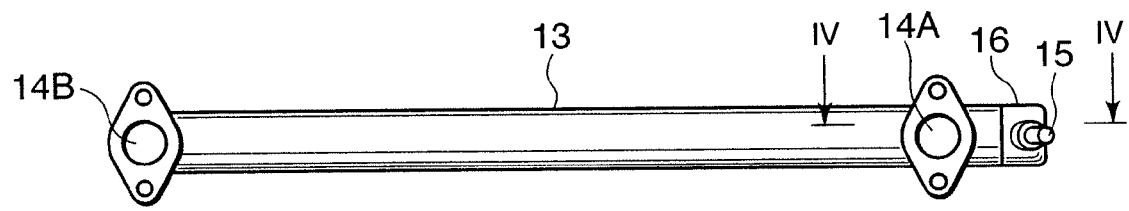
FIG. 3 is a front view of a communicating pipe according to this invention.

Referring to FIG. 3, the communicating pipe 13 is provided with communication ports 14A and 14B at either end thereof. The communication port 14A is connected to the communication port 12A of the intake collector 3A and the communication port 14B is connected to the communication port 12B of the intake collector 3B. The communicating pipe 13 has a function to equalize intake air amounts and/or intake air pressures in the two intake collectors 3A and 3B.

Figure 4:
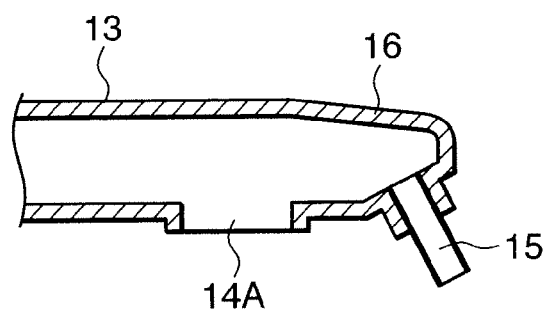
FIG. 4 is an enlarged longitudinal sectional view of a tip of the communicating pipe taken along a line IV-IV in FIG. 3.

Referring to FIG. 4, the communicating pipe 13 comprises an extension 16 which projects sideward from the communication port 14A. A negative pressure supply port 15 is formed on the extension 16. The negative pressure supply port 15 supplies negative intake pressure of the internal combustion engine to a brake booster provided for assisting a braking operation of the vehicle.

Figure 5:
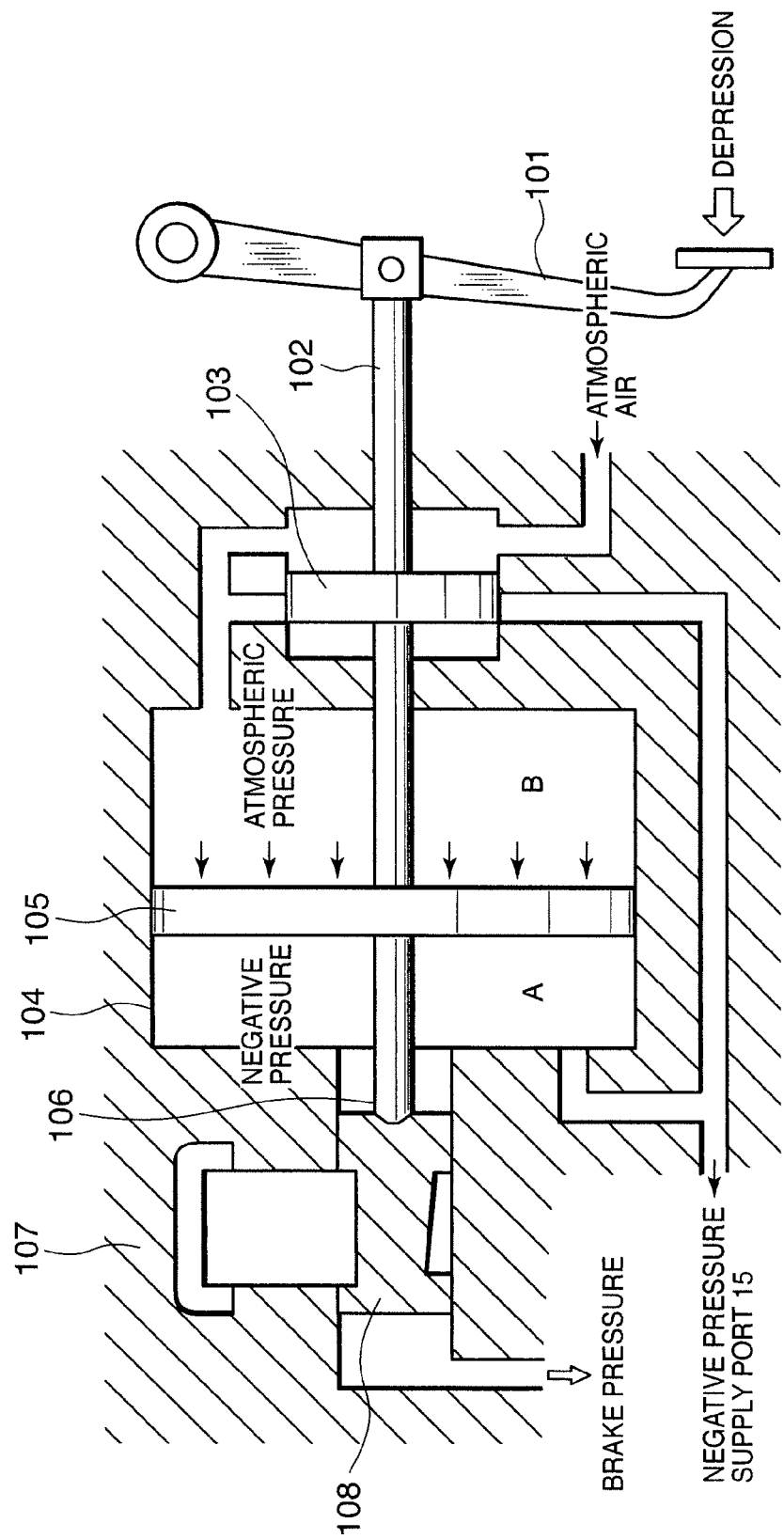
FIG. 5 is a schematic diagram of a brake booster connected to the internal combustion engine.

Referring to FIG. 5, the construction of the brake booster will be described. The vehicle is equipped with a brake system comprising a brake pedal 101, and a master cylinder 107 which generates a braking pressure in response to depression of the brake pedal 101 and supplies the braking pressure to brake cylinders of respective wheels. The brake booster is interposed in a braking pressure passage between the master cylinder 107 and the brake cylinders.

Depression of the brake pedal 101 is transferred to a master cylinder piston 108 in the master cylinder 107 via a valve operating rod 102 connected to the brake pedal 101, a valve plunger 103, a power piston 105 in a power cylinder 104, and a push rod 106.

The power piston 105 delimits a chamber A and a chamber B in the power cylinder 104. The chamber A is connected permanently to the negative pressure supply port 15 of the communicating pipe 13 via an air hose. The chamber B is selectively connected to the atmosphere and the negative pressure supply port 15 depending on the location of the valve plunger 103. In other words, when the brake pedal 101 is depressed, the valve plunger 103 is driven leftward in the figure via the valve operating rod 102 and the chamber B is opened to the atmosphere. When on the other hand the brake pedal 103 is released, the valve plunger 103 is driven rightward in the figure via the valve operating rod 102 under a biasing force of a return spring acting on the brake pedal 101, and the chamber B is connected to the negative pressure supply port 15.

When the brake pedal 101 is depressed, therefore, a pressure difference arises between the chamber B into which atmospheric pressure is introduced and the chamber A in which the intake negative pressure is introduced. This pressure difference serves as an assisting power to the action of the master cylinder 107.

When the brake pedal 101 is released, the brake pedal 101 returns to its original position. Accordingly, the valve plunger 103 displaces rightward in the figure so as to shutoff communication between the chamber B and the atmosphere, and connect the chamber B to the negative pressure supply port 15. As a result, the air in the chamber B flows into the two intake collectors 3A and 3B of the internal combustion engine via the negative pressure supply port 15 and the communicating pipe 13. The chamber B then experiences the same negative pressure as in the chamber A. The power cylinder 104 generates no assisting power in this state.

By providing the negative pressure supply port 15 on the communicating pipe 13 which connects the intake collectors 3A and 3B, air flow into the communicating pipe 13 is distributed to the two intake collectors 3A and 3B. There is therefore little difference between the intake air amounts in the right and left cylinder banks 1A and 1B, and the difference in the output torques between the right and left cylinder banks 1A and 1B is thereby suppressed.

Figure 6:
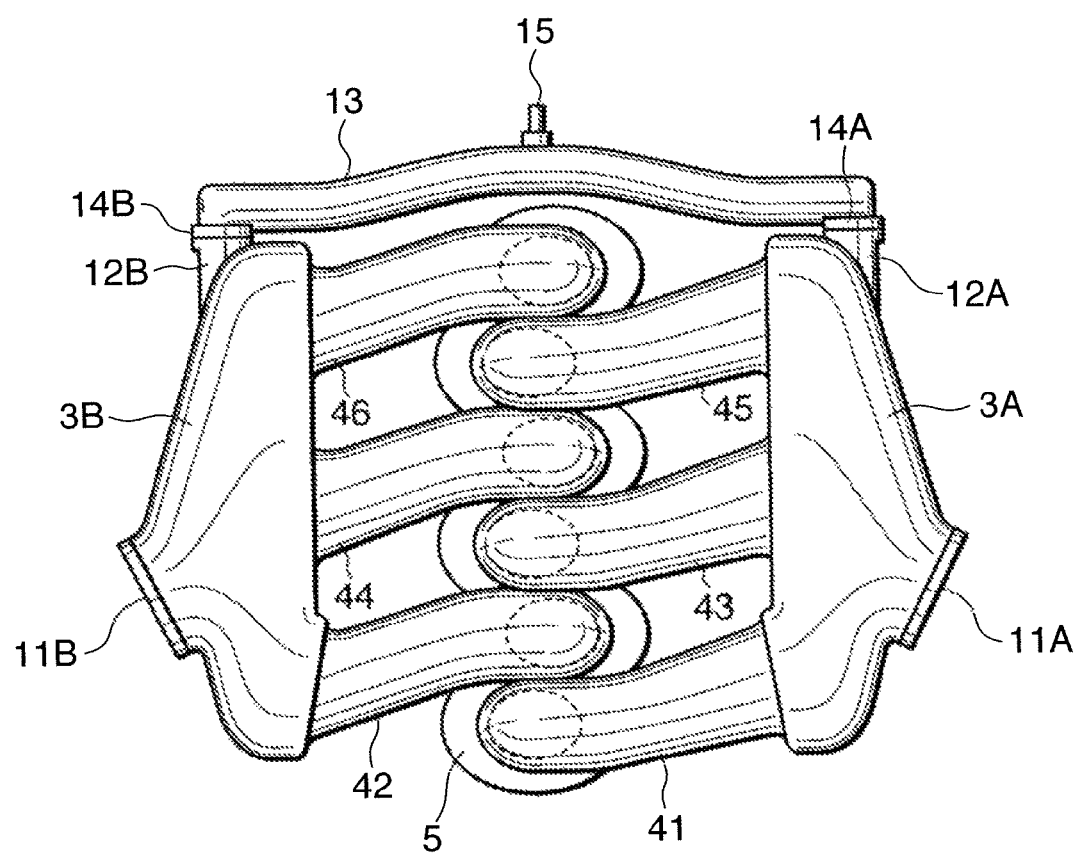
FIG. 6 is a plan view of essential parts of an internal combustion engine according to another embodiment of this invention.

It is preferable to equalize the air amounts distributed to the intake collectors 3A and 3B from the communicating pipe 13 as much as possible. As an air amount equalizing arrangement to realize this state, the negative pressure supply port 15 is preferably provided midway along the communicating pipe 13, or more precisely, at a midpoint between the communication ports 14A and 14B, as shown in FIG. 6.

However, providing the negative pressure supply port 15 midway along the communicating pipe 13 may be difficult depending on the layout of other equipment and accessories. For example, a partition delimiting an engine compartment from a passenger compartment of the vehicle may interfere with a connector connecting the air hose to the negative pressure supply port 15 located midway along the communicating pipe 13. In this embodiment, therefore, the negative pressure supply port 15 is provided on an extension 16 of the communicating pipe 13 projecting sideward beyond the communication port 14A. As a result, the negative pressure supply port 15 is located in the vicinity of the communication port 14A at a point distant from the communication port 14B.

Considering the location of the negative pressure supply port 15, when the brake pedal 101 is released from depression, air flowing into the communicating pipe 13 from the brake booster is distributed mostly to the communication port 14A and only a small amount of air is distributed to the communication port 14B which is distant from the negative pressure supply port 15. In this embodiment the air amount equalizing arrangement is constituted by an air amount deviation compensating arrangement which compensates for the deviation in the air distribution amount resulting from the location of the negative pressure supply port 15. The air amount deviation compensating arrangement will now be described.

Referring to FIG. 4, in this embodiment, the orientation of the negative pressure supply port 15 is determined such that a center axis of the negative pressure supply port 15 and a center axis of the communication port 14A intersect at an acute angle. According to this arrangement, the air flowing from the negative pressure supply port 15 to the communication port 14A is forced to change its flow direction steeply in the communicating pipe 13. As a result, the amount of air distributed from the negative pressure supply port 15 to the communication port 14A decreases and the amount of air distributed from the negative pressure supply port 15 to the communication port 14B increases, thereby compensating for the deviation in the air distribution. As the intersecting angle of the axis of the negative pressure supply port 15 and the axis of the communication port 14A decreases, the angle of the change in flow direction from the negative pressure supply port 15 to the communication port 14A increases, and hence the amount of air distributed from the negative pressure supply port 15 to the communication port 14A decreases. To enhance the compensation effect, therefore, it is preferable to dispose the negative pressure supply port 15 as close to the communication port 14A as possible in a state where the negative pressure supply port 15 is oriented in an identical direction to the communication port 14A. According to this air amount deviation compensating arrangement, the amount of air distributed to the communication port 14B, which is distant from the negative pressure supply port 15, can be increased.

The air amount deviation compensating arrangement should not be limited to an arrangement relating to the location and direction of the negative pressure supply port 15. By increasing the opening area of the communication port 14B relative to that of the communication port 14A, the amount of air flowing into the communication port 14B is increased. By increasing the inner diameter of the communicating pipe 13 towards the communication port 14B, the amount of air flowing into the communication port 14B is increased. Installing a hydrodynamic member such as an orifice, a guide plate, or a baffle plate in the communicating pipe 13 may also generate a relative increase in the amount of air distributed to the communication port 14B.

The contents of Tokugan 2007-270901, with a filing date of Oct. 18, 2007 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiments described above, the communicating pipe 13 is connected to the intake collectors 3A and 3B. However, this invention can be applied to an internal combustion engine in which the communicating pipe 13 is connected to the intake pipes 19A and 19B located upstream of the intake collectors 3A and 3B.

In the embodiments described above, the internal combustion engine comprises independent intake pipes 19A and 19B for the cylinder bank 1A and 1B. However, this invention can be applied to an internal combustion engine equipped with a sole intake pipe which is connected to the intake collectors 3A and 3B via branch pipes. In this case, the branch pipes constitutes the intake passages.

In the embodiments described above, this invention is applied to a V-shaped engine, but this invention can be applied to any internal combustion engine provided with a pair of intake passages including a horizontally-opposed engine.

The embodiments of this invention in which an exclusive property or privilege is claimed are defined as follows:

What is claimed is:

1. An air intake device for an internal combustion engine for a vehicle, comprising:
   a pair of intake passages;
   a communicating pipe disposed separately from the pair of intake passages and connecting the pair of intake passages so as to equalize the intake air amount/pressure in the pair of intake passages;
   a negative pressure supply port provided on the communicating pipe for supplying negative pressure to a brake booster which assists braking of the vehicle depending on the negative pressure; and
   wherein each of the pair of intake passages comprises an intake collector, and the communicating pipe is connected to the two intake collectors.

2. The air intake device as defined in claim 1, further comprising an equalizing arrangement which equalizes the amounts of air distributed to the pair of intake passages from the brake booster via the communicating pipe when a braking of the vehicle is released.

3. The air intake device as defined in claim 2, wherein the communicating pipe comprises two communication ports connected to the pair of intake passages, and the equalizing arrangement comprises disposing the negative pressure supply port at a midpoint between the two communication ports.

4. An air intake device for an internal combustion engine for a vehicle, comprising:
   a pair of intake passages;
   a communicating pipe connecting the pair of intake passages;
   a negative pressure supply port provided on the communicating pipe for supplying negative pressure to a brake booster which assists braking of the vehicle depending on the negative pressure;
   an equalizing arrangement which equalizes the amounts of air distributed to the pair of intake passages from the brake booster via the communicating pipe when a braking of the vehicle is released; and
   wherein the negative pressure supply port is disposed in a vicinity of one of communication ports, and the equalizing arrangement comprises an air amount deviation compensating arrangement which compensates for a deviation in the amounts of air distributed to two communication ports from the brake booster via the communicating pipe.

5. The air intake device as defined in claim 4, wherein the air amount deviation compensating arrangement comprises setting a direction of the negative pressure supply port to cause an axis of the negative pressure supply port and an axis of the one of the communication ports to intersect at an acute angle.

6. The air intake device as defined in claim 5, wherein the communicating pipe comprises an extension which extends sideward beyond the one of the communication ports, and the negative pressure supply port is provided on the extension.

\* \* \* \* \*